United States Patent
Pugh et al.

(10) Patent No.: US 9,777,082 B2
(45) Date of Patent: Oct. 3, 2017

(54) SYNTHESIS OF HYPERBRANCHED POLYACRYLATES BY EMULSION POLYMERIZSATION OF INIMERS

(71) Applicant: The University of Akron, Akron, OH (US)

(72) Inventors: Coleen Pugh, Akron, OH (US); Guillermina Garcia, Copley, OH (US)

(73) Assignee: The University of Akron, Akron, OH (US)

( * ) Notice: Subject to any disclaimer, the term of this patent is extended or adjusted under 35 U.S.C. 154(b) by 29 days.

(21) Appl. No.: 13/646,215

(22) Filed: Oct. 5, 2012

(65) Prior Publication Data
US 2013/0090442 A1    Apr. 11, 2013

Related U.S. Application Data

(60) Provisional application No. 61/543,415, filed on Oct. 5, 2011.

(51) Int. Cl.
| | | |
|---|---|---|
| *C08G 83/00* | (2006.01) | |
| *C08F 26/06* | (2006.01) | |
| *C08F 220/40* | (2006.01) | |

(52) U.S. Cl.
CPC ............ *C08F 26/06* (2013.01); *C08F 220/40* (2013.01); *C08G 83/005* (2013.01); *C08F 2438/01* (2013.01); *C08F 2438/02* (2013.01); *C08F 2438/03* (2013.01)

(58) Field of Classification Search
CPC .............. C08F 2438/00; C08F 2438/01; C08F 2438/02; C08F 2438/03; C08F 22/00; C08F 22/10; C08F 22/14; C08F 22/18; C08G 83/00; C08G 83/005

See application file for complete search history.

(56) References Cited

U.S. PATENT DOCUMENTS

| | | | |
|---|---|---|---|
| 6,759,491 B2 * | 7/2004 | Matyjaszewski et al. | ...... 526/90 |
| 2009/0176951 A1 * | 7/2009 | Matyjaszewski et al. | .... 526/200 |
| 2011/0046334 A1 * | 2/2011 | Pugh et al. | ................ 526/292.2 |

FOREIGN PATENT DOCUMENTS

WO    WO 2008045299 A1 *    4/2008    ............. C07C 67/14

* cited by examiner

*Primary Examiner* — Karuna P Reddy
(74) *Attorney, Agent, or Firm* — Renner Kenner Greive Bobak Taylor & Weber

(57) ABSTRACT

A method for the production of hyperbranched polyacrylates includes the step of reacting acrylic inimers through controlled living polymerization in aqueous conditions. The inimers may have the formula:

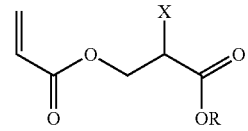

Wherein X is a halogen, a thiocarbonylthio or nitroxide group, and R is hydrogen, methyl, dodecyl, and groups containing mesogenin substituents, fluorocarbon substituents, siloxane substituents and oxyethylene substituents. In particular, the aqueous condition is emulsion or miniemulsion. The polymerization may be reverse ATRP, SN&RI and AGET polymerization or RAFT polymerization (with thiocarbonylthio X groups) or nitroxide mediated polyeization (with nitroxide X groups).

10 Claims, 3 Drawing Sheets

SYNTHESIS OF HYPERBRANCHED POLYACRYLATES BY EMULSION POLYMERIZSATION OF INIMERS

CROSS-REFERENCE TO RELATED APPLICATIONS

The present application claims the benefit of U.S. Provisional Patent Application 61/543,415, filed on Oct. 5, 2011, the content of which is incorporated herein by reference.

FIELD OF THE INVENTION

The present invention generally relates to the production of hyperbranched polyacrylates from inimers, which contain an initiating site (initiator) and polymerizable group (monomer) in the same molecule. In particular embodiments, this invention relates to the production of hyperbranched polyacrylates by miniemulsion polymerization of inimers, the miniemulsion continuous phase being water such that common caustic or otherwise undesirable solvents are avoided. In other embodiments, the hyperbranched polyacrylates are produced with higher molecular weights as compared to bulk/solution polymerizations (e.g. ATRP). In yet other embodiments, the hyperbranched polyacrylates are readily functionalized for a desired end use, and in yet other embodiments, they are biodegradable.

BACKGROUND OF THE INVENTION

The present invention advances previous work providing hyperbranched polyacrylates from polymerization of inimers. This previous work is described in pending U.S. Published Patent Application 2011/0046334. More particularly, while the 2011/0046334 publication teaches the production of inimers useful in the present invention, it teaches only bulk polymerization and solution polymerization techniques. Solution polymerization requires solvents that can be caustic or flammable or emit volatile organic compounds or otherwise require caution with use and/or storage. Bulk polymerization has its own disadvantages in that it tends to produce relatively low molecular weight polymers with broad molecular weight distributions, and suffers from high viscosity and heat generation. Additionally, aqueous based polymerizations (aqueous dispersion polymerizations) are a better alternative for continuous living polymerization techniques as they provide excellent heat transfer, ease of mixing, potentially higher molecular weights and similar. Thus, this prior art can benefit from the disclosure of water-based miniemulsion polymerization techniques for the creation of hyperbranched polyacrylates from such inimers. The present invention provides such disclosure.

SUMMARY OF THE INVENTION

In a first embodiment, this invention provides a method for the production of hyperbranched polyacrylates comprising the step of reacting acrylic inimers through controlled living polymerization in aqueous conditions.

In a second embodiment, this invention provides a method as in ihe first embodiment or second embodiment, wherein the controlled living polymerization is carried out in emulsion or in miniemulsion.

In a third embodiment, this invention provides a method as in paragraph the first embodiment or second embodiment, wherein the controlled living polymerization is selected from atom transfer radical polymerization (ATRP), reverse ATPRP, simultaneous normal and radical initiated (SN&RI) polymerization, activators generated by electron transfer (AGET) ATRP, reversible addition-fragmentation chain-transfer (RAFT) polymerization, and nitroxide mediated polymerization.

In a fourth embodiment, this invention provides a method as in any of the first through third embodiments, wherein the polymerization is carried out in a miniemulsion.

In a fifth embodiment, this invention provides a method as in any of the first through fourth embodiments, wherein the acrylic inimer is:

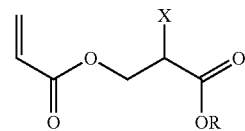

wherein X is a halogen and R is selected from hydrogen, methyl, dodecyl, and groups containing mesogenin substituents, fluorocarbon substituents, siloxane substituents and oxyethylene substituents.

In a sixth embodiment, this invention provides a method as in any of the first through fifth embodiments, wherein the controlled living polymerization is selected from reverse ATRP, SN&RI and AGET polymerization.

In a seventh embodiment, this invention provides a method as in any of the first through sixth embodiments, wherein the acrylic inimer is:

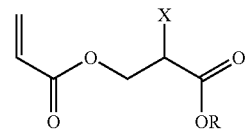

wherein X is a thiocarbonylthio group and R is selected from hydrogen, methyl, dodecyl, and groups containing mesogenin substituents, fluorocarbon substituents, siloxane substituents and oxyethylene substituents.

In an eighth embodiment, this invention provides a method as in any of the first through seventh embodiments, wherein the controlled living polymerization is RAFT polymerization.

In a ninth embodiment, this invention provides a method as in any of the first through eighth embodiments, wherein the acrylic inimer is:

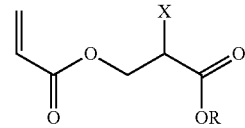

wherein X is a nitroxide group and R is selected from hydrogen, methyl, dodecyl, and groups containing mesogenin substituents, fluorocarbon substituents, siloxane substituents and oxyethylene substituents In a tenth embodiment, this invention provides a method as in any of the first through ninth embodiments, wherein the controlled living polymerization is nitroxide mediated polymerization.

DETAILED DESCRIPTION OF ILLUSTRATIVE EMBODIMENTS

This invention relates to the synthesis of hyperbranched polyacrylates from their corresponding acrylate-based inimers. These acrylate-based inimers and precursor esters are synthesized from halohydrins. The inimers are polymerized by controlled living polymerization techniques performed in aqueous dispersed systems, in particular embodiments, in emulsions and in other embodiments, miniemulsions.

In the present invention, useful inimers are synthesized from halohydrins. Halohydrins are typically synthesized by either direct hydrohalogentation of the corresponding olefin, or by first converting the olefin to an epoxide, followed by reaction with a hydrogen halide (HX, X=halogen; e.g., HCl, HBr). Per previous work mentioned in the background herein, halohydrins may also be created by converting the amine group of serine (or a serine derivative) to a halogen group by diazotization in the presence of a metal halide such as potassium halide (KX, X=halogen; e.g., KBr, KCl) as shown in Scheme 1, below:

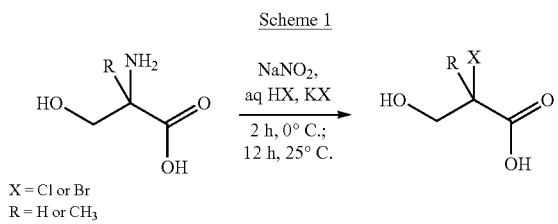

X = Cl or Br
R = H or CH3

When R is hydrogen, the reactant is serine. Though Scheme 1 shows the R group as being either H or CH3, R may be selected from alkyl, like methyl, ethyl, propyl, butyl and other groups. In preferred embodiments, the R group is H, and the reagent is serine.

The next step of creating the inimer involves the esterification of the halohydrin with an alcohol to provide a desired functional group. This may be achieved in any known manner, and may be synthesized through the classic Fischer esterification reaction as per the following Scheme 2:

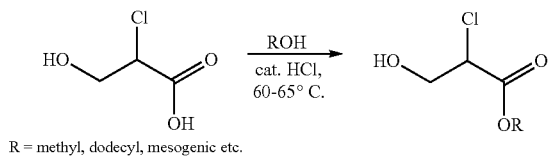

R = methyl, dodecyl, mesogenic etc.

Although chloride is shown, any halogen may be employed. This step incorporates a functional group in the final inimer and this functional group acts as a free ester pendant group in the end hyperbranched polyacrylate. This step requires an acid-catalyzed esterification method that can be done in the presence of the solvent or in the bulk. The alcohol (ROH) can be used as the limiting reagent, in slight excess, in equimolar amount or in large excess to produce the ester in moderate to higher yields. As an example: 2-chloro-3-hydroxypropionic acid was reacted with a large excess of methanol in the presence of a catalytic amount of HCl at moderate temperatures to produce methyl 2-chloro-3-hydroxypropionate. Moderate temperature was used to avoid any formation of the side product which can be resulting from the self-esterification of the 2-chloro-3-hydroxypropionic acid.

Figure 3:
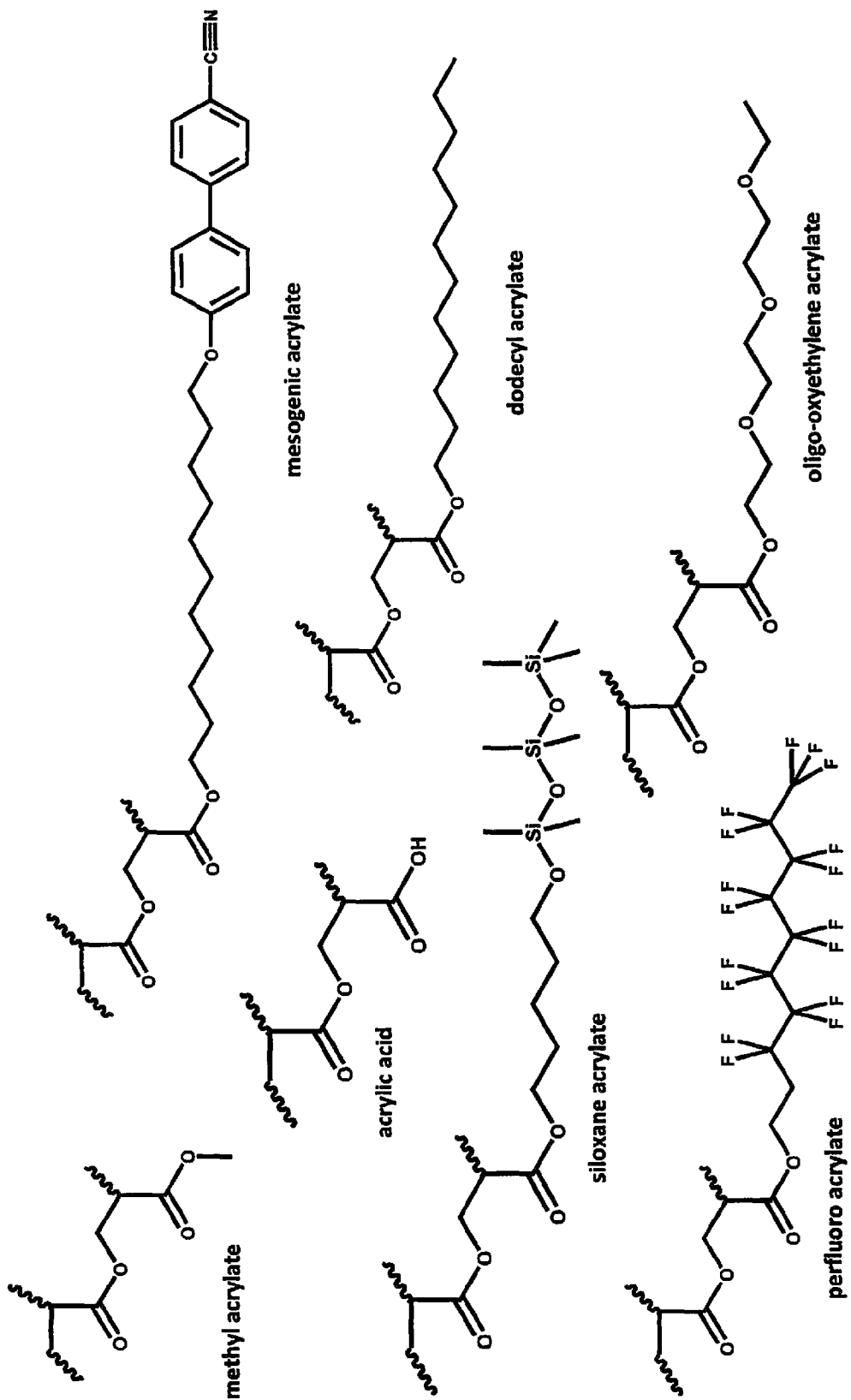
FIG. 3 shows various examples of the functionalizing of hyperbranched polyacrylates in accordance with this invention.

A variety of inimers containing different ester substituents can be provided including hydrogen, methyl, perfluoro, mesogenic, dodecyl, oligo-oxyethylene and siloxane containing ester substituents, i.e., R may be selected from hydrogen, methyl, dodecyl, and groups containing mesogenin substituents, fluorocarbon substituents, siloxane substituents and oxyethylene substituents. As will be seen, these ester substituents, as pendant groups, are readily available for beneficial use in a number of applications. Specific examples are provided in FIG. 3.

The hydroxy group-containing ester obtained from the halohydrin is further esterified to create the desired inimer. In particular embodiments, the hydroxyl group-containing ester is reacted with acid halides (e.e., acryloyl chloride, acryloyl bromide, methacryloyl chloride, methacryloyl bromide) or anhydrides (e.e., acrylic, methacrylic, maleic) using triethylamine as a reagent, as in Scheme 3, below:

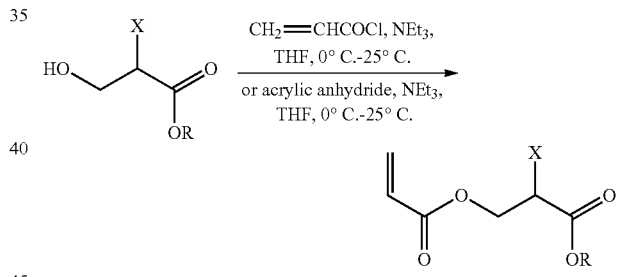

R = methyl, dodecyl, mesogenic etc.

This step incorporates a vinyl group in the inimer to act as a monomeric site in the polymerization step that forms the hyperbranched polyacrylate.

In case of bromohydrin-based esters, acrylic anhydride is preferably used for the esterification to avoid any halogen-exchange of the bromine group, which occurred when acryloyl chloride was used in esterification as confirmed with electron-ionization mass spectroscopy and 13C-NMR spectroscopy. When acryloyl chloride was used, a mixture of inimers having Br and Cl initiating sites was obtained.

As mentioned, useful inimers are disclosed in US2011/0046334, and are thus generally known. The present invention provides new methods for polymerizing these inimers, and, thus, the manner of forming the inimers is not necessarily germane to this invention.

In accordance with this invention, the X group halogen may be converted to a thiocarbonylthio group for using the inimer in RAFT polymerization, and may be converted to a nitroxide group for using the inimer in nitroxide mediated polymerization.

These synthesized inimers having a vinyl monomeric site and an initiating site both in the same molecule, may be polymerized to produce hyperbranched polyacrylates, as generally represented by way of example in the general schematic of Scheme 4 below:

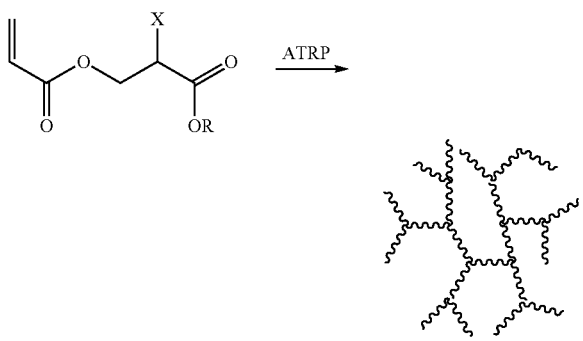

wherein ATRP stands for atom transfer radical polymerization. It should be noted, however, that the polymerization is not limited to ATRP polymerization, and other form of controlled living polymerization are employed in accordance with this invention, as disclosed more fully below. As mentioned, when the polymerization is RAFT polymerization, the X group will be a thiocarbonylthio group, and when the polymerization is a nitroxide mediated polymerization, the X group would be a nitroxide group. Notably, the inimers can be homopolymerized (as generally shown) or could be copolymerized with the other monomers to obtain the hyperbranched polyacrylates.

In accordance with the present invention, the inimers are polymerized either alone or with co-monomers, through emulsion or miniemulsion controlled living polymerization (CLP) techniques. By these techniques, hyperbranched polyacrylates are produced having many halogenated chain end groups and functional groups, which are attached to free ester pendant groups. The halogenated chain end groups can be modified to other groups and/or advantageously used for different applications. The functional groups on the pendant free ester can be chosen for a given application. One skilled in the art can synthesize an inimer with a functional group suitable for other living polymerization.

The comonomer may be selected from styrenes, acrylates, acrylamides, acrylonitrile, methacrylates, vinyl acetates, and vinyl alcohols and mixtures thereof. In some embodiments, the comonomer is selected from alpha methyl styrene, methacrylamides, methacrylonitrile and mixtures of the forgoing. In particular embodiments, the comonomer is selected from acrylates and styrene. In preferred embodiments, the comonomer is butyl acrylate. In RAFT polymerization, vinyl benzaldheyde may also be used. In nitroxide mediated polymerization, divinyl benzene may also be used.

The hyperbranched polyacrylates of this invention are made by CLP techniques in emulsion or miniemulsion systems. Thus, the inimer and, optionally, comonomer are formed as droplets in an aqueous continuous phase, the droplets having a droplet size of from 10 to 100 microns (emulsion) or 50 to 500 nm (miniemulsion). In emulsion systems, the inimer/comonomer droplets are formed by agitating a mixture of inimer (and optionally comonomer) and water with one or more surfactants. In miniemulsion systems, the inimer/comonomer droplets are formed by shearing a mixture of inimer (and optionally comonomer) and water with one or more surfactants and, optionally, stabilizers (such as hexadecane or cetyl alcohol. The appropriate shearing can be achieved by sonication (ultrasound), high powered homogenizers, and microfluidizers. A suitable homogenizer may be the MAanton Gaulin homogenizer. The initiator, which might be a single species or a mixture, and the catalyst, which will typically be a metal/ligand complex, are water soluble and is thus part of the aqueous phase.

Figure 1:
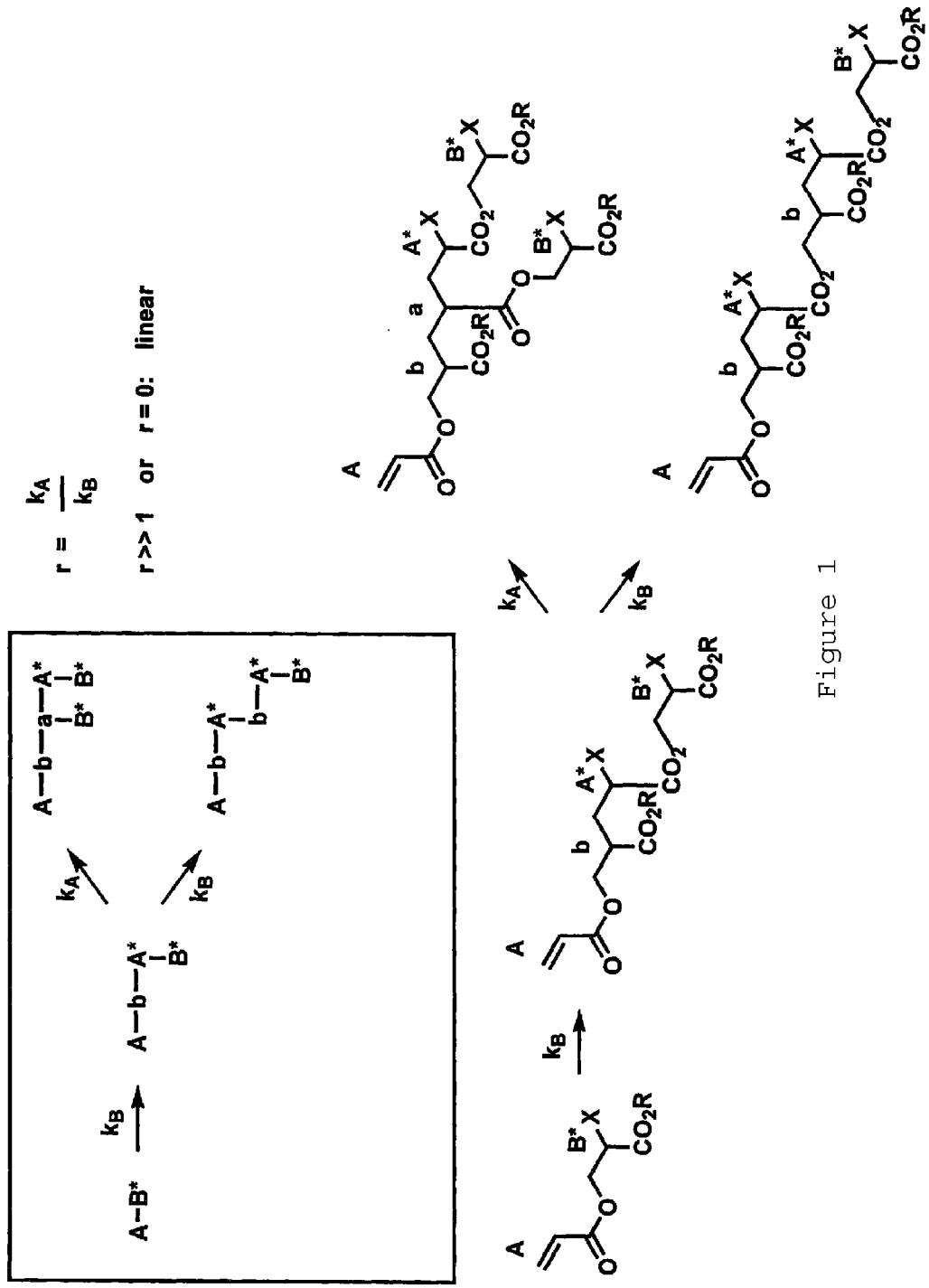
FIG. 1 provides a general schematic and a more particular representation of radical polymerization routes per the present invention and shows the pendant free ester groups that result from polymerization in accordance with this invention.

Regardless of the polymerization technique employed, a general understanding of the polymerization mechanism and the hyperbranched structures that can form can be appreciated from a review of FIG. 1. Therein, a general radical polymerization propagation is shown, first schematically, using A, a, B and b to represent the units of the inimer and propagation thereof, and then more specifically, employing an inimer in accordance with the teaching above. In the more specific polymerization propagation, the A, a, B and b species appear above units of the inimer and resulting polymers so that it can be readily seen how the general schematic relates to the polymerization routes of the inimer.

Figure 2:
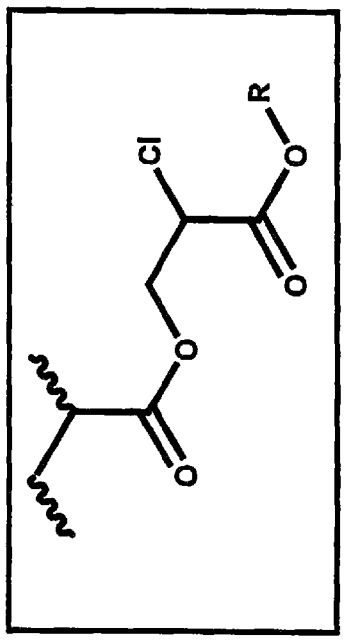
FIG. 2 provides additional hyperbranched structures that might result from polymerization in accordance with this invention.
Figure 2:
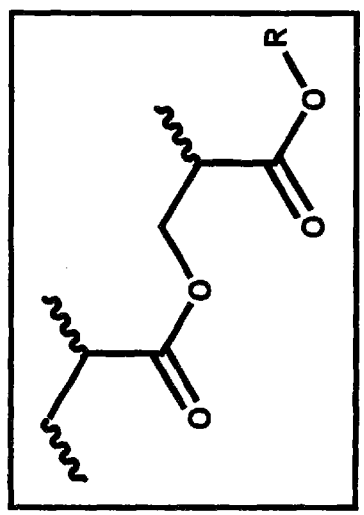
Figure 2:
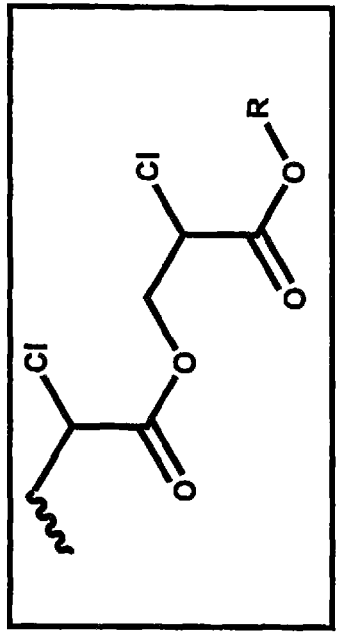
Figure 2:
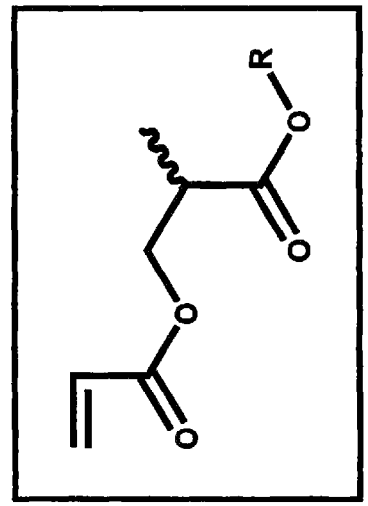

Notably, in light of the halogen extending off of the side chain in the inimer, the polymerization can take different routes. This is also shown in FIG. 2, which shows various microstructures for hyperbranched polyacrylates in accordance with this invention. It will be appreciated that, regardless of the polymerization route and the resulting hyperbranched structure, a multitude of pendant ester groups (—COOR) are provided, the R thereof being chosen for a given application. As examples, see FIG. 3.

In one or more embodiments, the inimer and optional comonomer are polymerized in the emulsion or miniemulsion through atom transfer radical polymerization (ATRP). This requires the use of a catalyst complex (metal plus ligand) and a surfactant to stabilize the emulsion or miniemulsion. An initiator is employed to initiate the radical species that propagate polymerization. The miniemulsion process may include additional stabilizer. In other forms of ATRP, other components may be necessary. For example, in the "activators generated by electron transfer" (AGET) ATRP process, a reducing agent is employed.

In one embodiment, the emulsion/miniemulsion is made according to the following procedure. An organic phase mixture is created including the catalyst complex and inimer/comonomer and is purged with nitrogen to drive off oxygen. The initiator may be added to this phase unless subsequent process steps would cause the initiation of polymerization too soon or if the initiator is unstable in the subsequent process conditions. The mixture may also be subjected to freeze, pump, thaw cycles to further ensure oxygen elimination. Heating is often necessary to create a homogeneous solution, so the mixture is placed in a hot bath and the temperature is increased, but maintained below a temperature that would initiate polymerization (activate the initiator). A temperature of from 50 to 60 C is often acceptable. This organic phase mixture is cooled and then added to an aqueous phase mixture.

The aqueous phase mixture includes water and surfactant, and, in miniemulsion embodiments in particular, further includes the stabilizer (e.g. hexadecane). The organic phase mixture is added to the aqueous phase mixture to create a polymerization mixture, which is agitated to create the desired emulsion or miniemulsion. Transfer of the organic phase mixture may be made with a canola syringe. The appropriate agitation is applied to provide the desired emulsion or miniemulsion.

Once the emulsion is formed it is transferred to a hot bath to increase the temperature and initiate the polymerization.

Agitation is maintained, but may be a mixing bar as opposed to sonication in the case of a miniemulsion. If not already present, the initiator can be added at this step, i.e., after the creation of the emulsion. In an AGET process, the reducing agent would be added after the creation of the emulsion.

In particular embodiments, the polymerization is a reverse ATRP. This is due to the fact that the more oxygen sensitive catalysts employed in direct (or forward) ATRP are sensitive to air to which the emulsion and particularly miniemulsion can be exposed during high shear mixing and passage through devices such as microfluidizers or sonicators. In the reverse ATRP process the catalyst complex is introduced to the polymerization system in a higher oxidation state and is reduced to a lower oxidation state when creating the radical species. An initiator is employed to initiate the radical species that propagate polymerization.

For reverse ATRP polymerization, suitable initiators may be selected from alkyl halide initiators. Suitable alkyl halide initiators include; ethyl-alpha bromo isobutyrate, poly(ethylene glycol)methyl ether-2-bromo isobutyrate, 2-hydroxyethyl-2-2bromoisobutyrate, 10-undecyl-2-bromo isobutyrate, preferred the methyl-alpha bromo isobutyrate. Particularly preferred initiators include azoisobutylnitrile (AIBN), and 2,2"-azo(bis(2-aminopropane)dihydrochloride (V-50).

Suitable metal catalysts may be selected from CuBr2, FeCl3, CoCl2, NiCl2. These may be complexed with ligands selected from hexamethylated tris(2-aminoethyl)amine (Me6TREN), diethylenetriamine (DETA), triethylenetetramine (TETA), N,N',N",N",N"',N"' hexamethyltriethylenetetramine (HMTETA), 1,4,8,1-tetraazacyclotetradecane (cyclam), Me4cyclam, dimethylated 1,8 ethylene cross-bridged 1,4,8,11, tetraazacyclotetradecane (DMCBCy), tetrakis(2-pyridylmethyl)ethylenediamine (TPEDA), tris(2-aminoethyl)amine (TPMA), glim-R, Pyln-R, bpy(R=H), di(5-nonyl)-2,2'-bypiridine (dNbpy), tNtpy(R=ChBu2), BPMPrA, BPMDA, BPMODA and N,N,N',N",N" pentamethyltdiethylenetriamine (PMEDTA). Particularly preferred catalyst complexes include Cu(II)Br2:PMEDTA (N,N,N', N",N" pentamethyldiethylenetriamine), Cu(II) Br2EHA6TREN and Cu(II) Br2:BPMODA.

Suitable surfactants may be selected from anionic surfactants such as sodium dodecyl sulfate (SDS) or sodium dodecyl benzene sulfonate (SDBS), which are most commonly used in research studies, while industrial formulations commonly employ mixed surfactant systems (anionic and non-ionic) to improve colloidal stability. In particular embodiments, suitable surfactants are chosen from alkyldiphenyloxide disulfonates such as Dowfax 8390, mixtures of sodium dodecyl sulfate and fluorotelomer sulfonamide alkylbetaines such as SDS/Forafac, PEO-PMA-Cl, sorbitane monooleate such as Span 80, and Preferred surfactants include polyoxyethylene oleyl ethers such as Brij 98 from Sigma Aldrich (Brij 98 includes 20 repeating polyoxyethylene groups) and polyoxyethylene (20) sorbitan monolaurate such as Tween 20. In emulsions, the surfactant concentration is maintained above the critical micelle concentration, while, in miniemulsion, the surfactant concentration is maintained below the critical micelle concentration. In emulsions, the surfactant concentration is maintained above the critical micelle concentration, while, in miniemulsion, the surfactant concentration is maintained below the critical micelle concentration.

In miniemulsions, a highly water-insoluble hdrophobe is employed as a costabilizer. Suitable co-stabilizers include hexadecane, hexadecanol, and cetyl alcohol. They are added along with the surfactant. They serve to stabilize the inimer/comonomer droplets against diffusional degradation.

In reverse ATRP, the emulsion or miniemulsion system is heated to thermally decompose the water soluble initiator, which can initiate the formation of oligoradicals with inimer and/or comonomer species within the water phase. These oligoradicals enter the droplets and initiate polymerization.

In other embodiments, the polymerization is a simultaneous normal and reverse initiation polymerization. This polymerization process, preserves the use of less oxygen sensitive catalysts, such as Cu(II) catalyst, while solving the problem of somewhat low initiation efficiency that is experienced with reverse ATRP. The concentration of the initiator, typically alkyl halide, generally determines the number of chains formed. A small amount of free radical initiator is also added. The activating catalyst species, such as Cu(I), is generated in situ by reduction of original catalyst species, such as Cu(II), as the free radical initiator descomposes.

For SN&RI polymerization, suitable initiators may be selected from alkyl halide initiators. Suitable alkyl halide initiators include; ethyl-alpha bromo isobutyrate, poly(ethylene glycol)methyla ether-2-bromo isobutyrate, 2-hydroxyethyl-2-2bromoisobutyrate, 10-undecyl-2-bromo isobutyrate, preferred the methyl-alpha bromo isobutyrate. Particularly preferred initiators include azoisobutylnitrile (AIBN), and 2,2"-azo(bis(2-aminopropane) dihydrochloride (V-50)

Suitable metal catalysts may be selected from CuBr2, FeCl3, CoCl2, NiCl2. These may be complexed with ligands selected from hexamethylated tris(2-aminoethyl)amine (Me6TREN), diethylenetriamine (DETA), triethylenetetramine (TETA), N,N',N",N",N"',N"' hexamethyltriethylenetetramine (HMTETA), 1,4,8,1-tetraazacyclotetradecane (cyclam), Me4cyclam, dimethylated 1,8 ethylene cross-bridged 1,4,8,11, tetraazacyclotetradecane (DMCBCy), tetrakis(2-pyridylmethyl)ethylenediamine (TPEDA), tris(2-aminoethyl)amine (TPMA), glim-R, Pyln-R, bpy(R=H), di(5-nonyl)-2,2'-bypiridine (dNbpy), tNtpy(R=ChBu2), BPMPrA, BPMDA, BPMODA and N,N,N',N",N" pentamethyltdiethylenetriamine (PMEDTA). Particularly preferred catalyst complexes include Cu(II)Br2:PMEDTA (N,N,N', N",N" pentamethyldiethylenetriamine), Cu(II) Br2EHA6TREN and Cu(II) Br2:BPMODA.

Suitable surfactants may be selected from anionic surfactants such as sodium dodecyl sulfate (SDS) or sodium dodecyl benzene sulfonate (SDBS) are most commonly used in research studies while industrial formulations commonly employ mixed surfactant systems (anionic and non-ionic) to improve colloidal stability. There are the usually for emulsion polymerization. However to prepare miniemulsions for CLP required non-ionic surfactant due to interaction between sulfate group with the catalyst complex systems. Subsequently the preferred surfactants include Dowfax 8390, SDS/Forafac, PEO-PMA-Cl, Span 80- and preferred surfactants are Brij 98 and Tween 20. In emulsions, the surfactant concentration is maintained above the critical micelle concentration, while, in miniemulsion, the surfactant concentration is maintained below the critical micelle concentration.

In miniemulsions, a highly water-insoluble hdrophobe is employed as a costabilizer. Suitable co-stabilizers include hexadecane, hexadecanol, cetyl alcohol. They are added along with the surfactant. They serve to stabilize the inimer/comonomer droplets against diffusional degradation.

In SN&RI polymerization, the emulsion or miniemulsion system is heated to thermally decompose the water soluble initiator, which can initiate the formation of oligoradicals with inimer and/or comonomer species within the water phase. These oligoradicals enter the droplets and initiate polymerization.

In yet other embodiments, the emulsion or miniemulsion polymerization is propagated by activators generated by electron transfer (AGET) polymerization. AGET ATRP is similar to SR&NI ATRP in that it starts with (pseudo)alkyl halides as initiators and transition metal complexes in their more stable oxidated state (e.g., Cu(II)Br2/ligand) as catalyst precursors. This allows the most active catalyst complexes to be added to the reaction prior to in-situ activation. However, instead of employing a conventional radical initiator to activate the catalyst complex as in "reverse" ATRP and SR&NI, a non-radical forming reducing agent is employed to generate the activator from the higher oxidation state transition metal complex.

For AGET polymerization, suitable initiators may be selected from alkyl halide initiators. Suitable alkyl halide initiators include; ethyl-alpha bromo isobutyrate, poly(ethylene glycol)methyla ether-2-bromo isobutyrate, 2-hydroxyethyl-2-2bromoisobutyrate, 10-undecyl-2-bromo isobutyrate, preferred the methyl-alpha bromo isobutyrate. Particularly preferred initiators include azoisobutylnitrle (AIBN), and 2,2"-azo(bis(2-aminopropane)dihydrochloride (V-50).

Suitable metal catalysts may be selected from CuBr2, FeCl3, CoCl2, NiCl2. These may be complexed with ligands selected from hexamethylated tris(2-aminoethyl)amine (Me6TREN), diethylenetriamine (DETA), triethylenetetramine (TETA), N,N',N",N",N"',N'" hexamethyltriethylenetetramine (HMTETA), 1,4,8,1-tetraazacyclotetradecane (cyclam), Me4cyclam, dimethylated 1,8 ethylene cross-bridged 1,4,8,11, tetraazacyclotetradecane (DMCBCy), tetrakis(2-pyridylmethyl)ethylenediamine (TPEDA), tris(2-aminoethyl)amine (TPMA), glim-R, Pyln-R, bpy(R=H), di(5-nonyl)-2,2'-bypiridine (dNbpy), tNtpy(R=ChBu2), BPMPrA, BPMDA, BPMODA and N,N,N',N",N" pentamethyltdiethylenetriamine (PMEDTA). Particularly preferred catalyst complexes include Cu(II)Br2:PMEDTA (N,N,N', N",N" pentamethyldiethylenetriamine), Cu(II) Br2EHA6TREN and Cu(II)Br2:BPMODA.

Suitable surfactants may be selected from anionic surfactants such as sodium dodecyl sulfate (SDS) or sodium dodecyl benzene sulfonate (SDBS) are most commonly used in research studies while industrial formulations commonly employ mixed surfactant systems (anionic and non-ionic) to improve colloidal stability. There are the usually for emulsion polymerization. However to prepare miniemulsions for CLP required non-ionic surfarfactant due to interaction between sulfate group with the catalyst complex systems. Subsequently the preferred surfactants include Dowfax 8390, SDS/Forafac, PEO-PMA-Cl, Span 80 and preferred surfactants are Brij 98 and Tween 20. In emulsions, the surfactant concentration is maintained above the critical micelle concentration, while, in miniemulsion, the surfactant concentration is maintained below the critical micelle concentration.

In miniemulsions, a highly water-insoluble hdrophobe is employed as a costabilizer. Suitable co-stabilizers include hexadecane, hexadecanol, cetyl alcohol. They are added along with the surfactant. They serve to stabilize the inimer/comonomer droplets against diffusional degradation.

Suitable reducing agents may be selected from Fe3, Mg2+, Mn, 3-mercaptopropionic acid (3-MPA), Ni, phenyl silane, phosphorous acid, KI, Zn, triethylsilane, triphenyl phosphate and trimethyl phosphate.

In other embodiments, the hyperbranched polyacrylates are formed by reversible addition-fragmentation chain transfer (RAFT) polymerization, in emulsion or miniemulsion. RAFT polymerization utilizes a chain transfer agent (or "RAFT agent") that reacts with a propagating macroradical initiated by a conventional free radical initiator. The leaving group of the RAFT agent is a radical species which then initiates the chain. The total number of chains in the system is the sum of the transfer agent and primary radical molecules. A larger excess of transfer agent to initiator yields a greater living nature. A highly active transfer agent (Ctr>100) is rapidly consumed (within a few percent monomer conversion) while a less active transfer agent (e.g., xanthyanes, Ctr~1) may not be consumed until most of the polymerization is complete.

Intiators may be chosen from ACPA, V-50, 2,2'-azobis(isobutylronitrile) (AIBN).

The RAFT agents are thiocarbonylthio compounds and are part of the inimer, at the location of X in the inimer disclosure provided above.

Suitable surfactants may be chosen from V-50 and SDS.

An organic phase mixture is created including the thiocarbonylthio-functionalized inimer and any desired comonomer and is purged with nitrogen to drive off oxygen. The initiator may be added to this phase unless subsequent process steps would cause the initiation of polymerization too soon or if the initiator is unstable in the subsequent process conditions. The mixture may also be subjected to freeze, pump, thaw cycles to further ensure oxygen elimination. Heating is often necessary to create a homogeneous solution, so the mixture is placed in a hot bath and the temperature is increased, but maintained below a temperature that would initiate polymerization (activate the initiator). A temperature of from 50 to 60 C is often acceptable. This organic phase mixture is cooled and then added to an aqueous phase mixture.

The aqueous phase mixture includes water and surfactant, and, in miniemulsion embodiments in particular, further includes the stabilizer (e.g. hexadecane). The organic phase mixture is added to the aqueous phase mixture to create a polymerization mixture, which is agitated to create the desired emulsion or miniemulsion. Transfer of the organic phase mixture may be made with a canola syringe. The appropriate agitation is applied to provide the desired emulsion or miniemulsion. If not already added, the initiator can be added to the emulsion.

Once the emulsion is formed it is transferred to a hot bath to increase the temperature and initiate the polymerization. Agitation is maintained, but may be a mixing bar as opposed to sonication in the case of a miniemulsion. If not already present, the initiator can be added at this step, i.e., after the creation of the emulsion.

In other embodiments, the hyperbranched polyacrylates are formed through nitroxide mediated polymerization techniques, in emulsion or miniemulsion. Nitoxide mediated polymerization employs a stable nitroxide (e.g. TEMPO); 2,2,6,6-tetramethyl-1-piperinyloxy) to reversibly terminate macroradicals, thereby yielding a dormant chain. The equilibrium is shifted strongly toward the dormant species so that the propagating radical concentration is lower than in conventional radical polymerization. Under typical reaction conditions, a dormant chain may be activated every ~102 to 103 seconds on average.

The RAFT agents are thiocarbonylthio compounds and are part of the inimer, at the location of X in the inimer disclosure provided above. Suitable nitroxides may be selected from TEMPO (2,3,6,6-tetramethyl-1-piperidinyloxy) and N-tert-butyl-N-(1-diethyl-phosphono-2-2-dimethylpropyl)nitroxide, better known as SG1 (Arkema Group).

Costabilizers for miniemulsion processes can be used as hexadecane, hexadecanol, and cetyl alcohol.

Nitroxide scavengers can be used to increase the polymerization rate. The nitroxide scavengers may be selected from ascorbic acid and ascorbic acid-6-palmitate.

In this embodiment, a catalyst is not employed. Thus the organic phase mixture is created including the nitroxide-functionalized inimer and any desired comonomer and is purged with nitrogen to drive off oxygen. The mixture may also be subjected to freeze, pump, thaw cycles to further ensure oxygen elimination. Heating is often necessary to create a homogeneous solution, so the mixture is placed in a hot bath and the temperature is increased, but maintained below a temperature that would initiate polymerization (activate the initiator). A temperature of from 50 to 60 C is often acceptable. This organic phase mixture is cooled and then added to an aqueous phase mixture.

The aqueous phase mixture includes water and surfactant, and, in miniemulsion embodiments in particular, further includes the stabilizer (e.g. hexadecane). The organic phase mixture is added to the aqueous phase mixture to create a polymerization mixture, which is agitated to create the desired emulsion or miniemulsion. Transfer of the organic phase mixture may be made with a canola syringe. The appropriate agitation is applied to provide the desired emulsion or miniemulsion.

Once the emulsion is formed the temperature is increased to initiate polymerization. Agitation is maintained, but may be a mixing bar as opposed to sonication in the case of a miniemulsion.

IV. Functionalizing

Depending upon the requirements, inimers with different ester substituents can be produced. The hyperbranched polymers resulting from these inimers having different ester groups attached as pendant groups of the polyacrylates can be used in different applications. These polymers would have lower viscosity and shear thinning behavior, which would ease their processing. Since they have a large number of end groups, which can be directly used for better interactions with the other substrates or can be modified and used. Incorporation of the different functional groups in the polymer obtained can be potentially used in wide variety of the applications from additives, surface coatings, drug delivery materials to high-tech liquid crystalline display devices. Hyperbranched polyacrylate with oligo-oxyethylene/oligo(ethylene glycol) side chains can be used in water based adhesives, in cosmetics as viscosity modifiers and in polymer electrolytes or ion-conducting polymers. Hyperbranched polyacylic acid and its salts can also be used in superabsorbent materials and in polyelectrolytes. Siloxane containing hyperbranched polyacrylates could be a potential competitor in materials for contact lenses because of higher oxygen permeability. They can also be used in hydrogels as halogen end groups in the hyperbranched polymers can be used for cross-linking sites. The halogen end groups can also be reduced to hydrogen for other applications, such as those requiring more stability. Siloxane containing inimers can also be copolymerized with hydroxy ethyl methacrylate to get the optimum oxygen permeability and water absorption. These hyperbranched polymers can also be used in fabrication of organic-inorganic hybrids and nanomaterials. Patterning of polymer films at micron or submicron level can be achieved because of functional end groups present in the hyperbranched polymer. Moities with interesting optical, biological, mechanical and electrochemical properties can be incorporated into the hyperbranched polymer films. Because of the low viscosity and abundant functional end groups, these polymers can be used in coatings, adhesives, viscosity modifiers and in packaging. Since, various desired ester group can be incorporated within the inimer, a wide variety of polyacrylates for different applications can be used.

The hyperbranched polyacrylates formed in accordance with this invention may be maintained in the emulsified form as a latex. In miniemulsions, the particle size in the latex may be from 50 to 500 nm, and in particular embodiments from 150 nm to 300 nm, and, in other embodiments, 200 nm. The number average (Mn) molecular weight of the hyperbranched polyacrylate may range from 1000 DA to 1 million DA. In other embodiments, the molecular weight is from 100,000 DA to 800,000 DA. In other embodiments, the molecular weight is from 200,000 DA to 700,000 DA. In other embodiments, the molecular weight is from 500,000 DA to 600,000 DA. In yet other embodiments, the molecular weight is greater than 50,000 and less than 70,000. In some embodiments the polydispersity, PDI (Mn/Mw) is equal to or greater than 1.1 and less than or equal to 5. In other embodiments the polydispersity is equal to or greater than 1.2 and less than or equal to 3.5. In other embodiments the polydispersity equal to or greater than 1.5 and less than or equal to 2.5.

In light of the foregoing, it should be appreciated that the present invention significantly advances the art by providing emulsion and miniemulsion polymerization of inimers to create hyperbranched polyacrylates. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow. Specific examples are provided in experiments described below, and the skilled artisan will appreciate their application to the disclosures provided above.

EXAMPLES

Materials

Anisole (Aldrich, anhydrous, 99.7%), acrylic acid (Sigma Aldrich, >99.5%), acryloyl chloride (Across Organics N.Vn >97%), Brij 98™ (Polyoxyethylene(20)oley etherSpectrum, 99%), n-butanol (Sigma Aldrich, 99.8%), n-butyl acrylate (Sigma Aldrich, passed over basic alumina to eliminate inhibitors, 99.5%), cupric bromide (Sigma Aldrich, 99.99%), hexadecane (Fluka, >99.8%), hydroxyethyl methacrylate (Aldrich, 97%), methacrylic acid (Sigma Aldrich, 99.99%), methacryloyl chloride (source, purity), methyl 2-bromopropionate (Aldrich, 99%), N,N,N',N'-pentamethyldiethylenetriamine (PMDETA, Aldrich, 99%), D,L-serine (Sigma, >98%), and sodium nitrite (Sigma Aldrich, 99.5%) were used as received. Surfactants A and N were generously denoted by OMNOVA Solutions. Azoisobutyronitrile (AIBN) (Aldrich, 98%) was recrystallized from methanol below 40° C., dried in vacuo and stored in the freezer. Cuprous bromide (Aldrich, 98%) was purified by stirring with glacial acetic acid overnight, and then washing several times with ethanol. 4,4'-Diheptyl-2,2'-dipyridyl (dHBipy) and tris(2-(dimethylamino)ethyl)amine (Me6TREN) were synthesized by literature procedures. triethylamine (Aldrich distilled over KOH, 100%) Reagent grade tetrahydrofuran (THF) was dried by distillation from purple sodium benzophenone ketyl under N2. All other reagents and solvents were commercially available and were used as received.

Techniques

All reactions were conducted on a Schlenk line in a N2 atmosphere unless noted otherwise. 1H (300 MHz) and 13C (75 MHz) NMR spectra were recorded on either Varian Mercury 300 spectrometer. 2-D NMR spectra were recorded on the Varian 500 spectrometer. Unless noted otherwise, all spectra were recorded in CDCl3, and the resonances were measured relative to residual solvent resonances and referenced to tetramethylsilane (0.00 ppm). Elemental analysis was performed by Atlantic Microlab, Inc. Number—(Mn) and weight-average (Mw) molecular weights and polydispersities (pdi=Mw/Mn) were determined by gel permeation chromatography (GPC) relative to linear polystyrene from calibration curves of log Mn vs. elution volume at 35° C. using THF as solvent (1.0 mL/min), a set of 50, 100, 500, 104 Å, and linear (50-104 Å) Styragel 5 m columns, a Waters 486 tunable UV/Vis detector set at 254 nm, a Waters 410 differential refractometer, and Millenium Empower software. Thermal analysis was performed using a Perkin Elmer Pyris 1 differential scanning calorimeter. Glass transition temperatures (Tg) were determined as the middle of the change in heat capacity. Heating and cooling rates were 10° C./min. Transition temperatures were calibrated using indium and tin standards; enthalpy was calibrated using an indium standard.

Synthesis of Acrylic Anhydride (4A)

Acrylic anhydride was synthesized in 77.0% yield as the following example. A solution of acryloyl chloride (2.7 g, 30 mmol in THF (50 mL) and a solution triethylamine (2.8 g, 28 mmol) in THF (25 mL) were added dropwise over 5 min separately but simultaneously to an ice-cooled solution of acrylic acid (2.0 g, 28 mmol) in THF (150 mL). The resulting solution was stirred at room temperature for 16 h. The NH4+Cl— precipitate was filtered off in a fritted glass filter, and the THF was then removed form the filtrate by rotary evaporation. The residue was dissolved in CH2Cl2 (50 mL), and washed twice with dil aq NaHCO3 (25 mL ea) and once with saturated NaCl (50 mL), and dried over Na2SO4. After filtration and removing the solvent by rotary evaporation, the remaining yellow oil was distilled (65° C./3 mm Hg), to yield 15 g (35%) of acrylic anhydride as a colorless liquid. 1H NMR: 6.08 (dd, HCH=trans to CO2, 3Jcis=10.4 Hz, 2J=1.4 Hz, 2H), 6.18 (dd, CH=, 3Jtrans=16.7 Hz, 3Jcis=10.9 Hz, 2H), 6.56 (dd, HCH=cis to CO2, 3Jtrans=16.7 Hz, 2J=1.4 Hz, 2H). 13C NMR: 127.4 (CH=), 134.7 (CH2=) 161.2 (C=O).

Synthesis of Methacrylic Anhydride (5A)

Methacrylic anhydride was synthesized in 77.03% yield as the following example. Methacryloyl chloride (6.3 g, 60 mmol) in THF (40 mL) was added dropwise over 5 min to an ice-cooled solution of methacrylic acid (5.2 g, 60 mmol), triethylamine (5.5 g, 54 mmol) in THF (200 mL). The solution was stirred at room temperature for 16 h. The NH4+Cl— precipitated was collected in a fritted glass filter, and the THF was then removed form the filtrate by rotary evaporation. Until completed elimination of THF, the residue was dissolved in CH2Cl2 (50 mL), and washed twice with dil aq NaHCO3 (25 mL ea) and once with saturated NaCl (50 mL), and dried over Na2SO4. After filtration and removing the solvent by rotary evaporation, 8.0 g (73%) of methacrylic anhydride was obtained as a light yellow liquid. 1H NMR: 2.02 (s, CH3, 6 H), 5.83 (s, HCH=cis to CO2, 2J=16.6 Hz, 2H), 6.24 (HCH=trans to CO2, 2J=16.6 Hz, 2H). 13C NMR: 17.7 (CH3), 128.x (CH=), 135.x (CH2=), 163.x (C=O).

Synthesis of 2-Chloro-3-hydroxypropionic acid (39A)

Sodium nitrite (68, 0.99 mol) was added in portions over 3 h to a solution of D,L-serine (52 g, 0.50 mol), HCl (116 g, 38% w/v, 1.2 mol, 15 min) and potassium chloride (130 g, 1.8 mol) in water (490 mL) at −10° C. In the beginning of the addition, vapor was produced and removed with the flow of nitrogen. After stirring at room temperature for 24 h, the light-greenish solution was saturated with NaCl and extracted five times with ethyl acetate (100 mL ea). The solvent was removed from the combined organic extracts by trap-to-trap distillation, and dried with Na2SO4. The residue was dissolved in 8 drops of CH2Cl2 to obtain 2-chloro-3-hydroxypropionic acid as a white solid. 1H NMR (CDCl3/DMSO-d6): 3.96 (dd, CHHOH, 2J=11.9 Hz, 3J=5.7 Hz), 4.01 (dd, CHHOH, 2J=12.2 Hz, 3J=5.7 Hz), 4.50 (dd, CHCl, 3J=3J=5.7 Hz), 6.40 (br s, CO2H and OH).

Synthesis of 2-Bromo-3-hydroxypropionic acid (2A)

Sodium nitrite (12 g, 0.17 mol), was added in portions over 2.5 h to a solution of D,L-serine (10 g, 97 mmol), HBr (26 mL, 48% w/v, 0.23 mol) and potassium bromide (40 g, 0.34 mol) in water (88 mL) at −10° C. After stirring at room temperature for 24 h, the light yellow solution was saturated with NaCl and extracted five times with ethyl acetate (50 mL). The combined organic extracts were dried over Na2SO4. After filtration and removing the solvent by trap-to-trap distillation, the residue was recrystallized using CH2Cl2 (4 mL) containing two drops of ethyl acetate to obtain 10 g (63%) of 2-bromo-3-hydroxypropionic acid as a white hygroscopic solid. 1H NMR: 3.89 (dd, CHHOH, 2J=11.9 Hz, 3J=5.5 Hz), 3.99 (dd, CHHOH, 2J=12.2 Hz, 3J=7.2 Hz), 4.30 (dd, CHBr, 3J=5.7 Hz, 3J=7.2 Hz), 7.19 (br s, CO2H and OH). 13C NMR: 45.6 (CHBr), 64.0 (CH2OH), 171.0 (C=O). Elemental Analysis (C3H5BrO3): Calculated 21.32, H, 2.98. found C, 20.95; H, 2.90.

Synthesis of Methyl 2-bromo-3-hydroxypropionate

A solution of 2-bromo-3-hydroxypropionic acid (6.0 g, 35 mmol) and a catalytic amount of HBr (0.2 mL, 48 w/w % aq) in methanol (50 mL, 1.2 mol) was stirred at 65° C. for 21 h. Excess methanol was then removed by rotary evaporation. The brownish liquid residue was dissolved in CH2Cl2 (100 mL) and washed twice with dilute aq NaHCO3 (50 mL ea) and once with satd aq NaCl (50 mL), and then dried over Na2SO4. After filtration and removing the solvent by rotary evaporation, the resulting slightly yellow liquid was purified by column chromatography (Rf=0.31) using silica gel as the stationary phase and CH2Cl2/Et2O (95:5 v/v) as the eluant to yield x.x g (55%) of methyl 2-bromo-3-hydroxypropionate as a colorless liquid. 1H NMR: 2.70 (br s, OH), 3.81 (s, CH3), 3.93 (dd, CHHOH, 2J=12.0 Hz, 3J=5.5 Hz), 4.04 (dd, CHHOH, 2J=12.1 Hz, 3J=7.4 Hz), 4.35 (dd, CHBr, 3J=5.6 Hz, 3J=7.4 Hz). 13C NMR (75 MHz, CDCl3): 44.2 (CHBr), 53.5 (CH3), 63.8 (CH2OH), 169.7 (C=O). Anal. C, H: calcd 26.23, 3.86. found 25.83, 4.10.

Synthesis of butyl 2-n-bromo-3-hydroxypropionate

A solution of 2-bromo-3-hydroxypropionic acid (11 g, 66 mmol) and a catalytic amount of HBr (0.2 mL, 48 w/w % aq)

in n-butanol (42 mL, 0.46 mol) was stirred at 65° C. for 24 h. Excess n-butanol was then removed by distillation ((45° C./3 mm Hg). The remaining yellow liquid residue was dissolved in CH2Cl2 (100 mL) and washed twice with dilute aq NaHCO3 (50 mL ea) and once with satd aq NaCl (100 mL), and then dried over Na2SO4. After filtration and removing the solvent by rotary evaporation, the crude product was purified by column chromatography (Rf=0.23) using silica gel as the stationary phase and CHCl3/Et2O (95:5 v/v) as the eluant to yield n-butyl 2-bromo-3-hydroxypropionate as a colorless liquid. 1H NMR: 0.90 (t, CH3, J=6.6 Hz), 1.37 (hext, CH2CH3, J=x.x Hz), 1.64 (quint, CH2CH2O2C, J=7.0 Hz), 2.66 (br s, OH), 3.93 (dd, CHHOH, 2J=12.0 Hz, 3J=5.5 Hz), 4.04 (dd, CHHOH, 2J=12.1 Hz, 3J=7.4 Hz), 4.20 (t, CH2O2C, J=6.8 Hz), 4.35 (dd, CHBr, 3J=5.6 Hz, 3J=7.4 Hz). 13C NMR: 14.3 (CH3), 22.9 (CH2CH3), 28.6 (CH2CH2O2C), 44.2 (CHBr), 66.8 (CH2O2C), 63.8 (CH2OH), 169.7 (C=O). Elemental Analysis (CxHyBrO3):

Synthesis of Methyl 2-chloro-3-hydroxypropionate

A solution of 2-chloro-3-hydroxypropionic acid (4.6 g, 32 mmol) and a catalytic amount of HCl (0.2 mL) in methanol (50 mL, 1.2 mol) was stirred at 65° C. for 21 h. Excess methanol was then removed by rotary evaporation. The brownish liquid residue was dissolved in CH2Cl2 (100 mL) and washed twice with dilute aq NaHCO3 (50 mL ea) and once with satd aq NaCl (50 mL), and then dried over Na2SO4. After filtration, 4.6 g of methyl 2-chloro-3-hydroxypropionate was obtained as a slightly yellowish liquid by trap-to-trap distillation; this compound was used without further purification. 1H NMR: 2.55 (OH), 3.82 (CH3), 3.96 (dd, CHHOH, 2J=12.0 Hz, 3J=5.6 Hz), 4.04 (dd, CHHOH, 2J=11.9 Hz, 3J=5.9 Hz), 4.41 (dd, CHCl, 3J=3J=5.7 Hz). 13C NMR: 53.4 (CH3), 57.0 (CHCl), 64.2 (CH2OH), 169.0 (C=O). Anal. C, H: calcd 34.68, 5.09. found 34.33, 4.99.
Preparation of the Inimers Synthesis of (2-Chloro-2-methoxycarbonyl)ethyl Acrylate A solution of acryloyl chloride (5.4 g, 58 mmol) in THF (5 mL) was added dropwise over 30 min to an ice-cooled solution of methyl 2-chloro-3-hydroxypropionate (4.6 g, 32 mmol) and triethylamine (5.9 g, 58 mmol) in THF (5 mL), and the reaction mixture was stirred for 10 min at 0° C. In the beginning of the addition, vapor was produced as triethylammonium chloride precipitated. After stirring at room temperature for an additional 16 h, the precipitated triethylammonium chloride was filtered off, and the brown filtrate solution was poured into ice water (200 mL) and extracted five times with CH2Cl2 (50 mL ea). The combined organic extracts were washed twice with dil. aq. NaHCO3 (50 mL ea) and once with satd aq NaCl (50 mL), and dried over Na2SO4 (5 g). After filtration, 9.7 g of (2-chloro-2-methoxycarbonyl)ethyl acrylate was obtained as a brownish liquid by trap-to-trap distillation; this compound was used without further purification. 1H NMR: 3.79 (s, CH3), 4.47 (dd, CHHO2C, 2J=11.6 Hz, 3J=7.9 Hz), 4.52 (dd, CHCl, 3J=3J=7.9 Hz), 4.56 (dd, CHHO2C, 2J=11.6 Hz, 3J=8.0 Hz), 5.86 (dd, CHHb=trans to CO2, 2Jab=1.2 Hz, 3Jbc=10.4 Hz), 6.10 (dd, =CHc, 3Jac=17.3 Hz, 3Jbc=10.4 Hz), 6.41 (CHaH=cis to CO2, 2Jab=1.2 Hz, 3Jac=17.3 Hz). 13C NMR: 53.5 (CH3), 53.7 (CHCl), 64.6 (CH¬2O2C), 127.6 (CH=), 132.3 (CH2=), 165.4 (acrylate C=O), 167.9 (CO2CH3). Anal. C, H: calcd 43.65, 4.71. found 43.48, 4.73.

Synthesis of (2-Bromo-2-methoxycarbonyl)ethyl Acrylate inimer

A solution of acrylic anhydride (1.1 g, 8.6 mmol) in THF (20 mL) was added dropwise to a solution of methyl 2-bromo-3-hydroxypropionate (1.6 g, 8.9 mmol) and triethylamine (0.87 g, 8.6 mmol) in THF (2 mL), and the reaction mixture was stirred for 10 min at 0° C. After stirring at room temperature for an additional 16 h, the light yellowish solution was poured into ice water (200 mL). Since no precipitate formed, the aq mixture was extracted five times with CH2Cl2 (50 mL ea). The combined organic extracts were washed twice with dil. aq. NaHCO3 (50 mL ea) and once with satd aq NaCl (50 mL), and dried over Na2SO4 (5 g). After filtration and removing the solvent by distillation at atmospheric pressure, the colorless liquid residue was distilled (93° C./2 mm Hg) to yield 1.3 g of (2-bromo-2-methoxycarbonyl)ethyl acrylate as a white solid; Tm=32° C. 1H NMR: 3.83 (s, CH3), 4.46 (dd, CHBr, 3J=5.8 Hz, 3J=8.1 Hz), 4.56 (dd, CHHO2C, 2J=11.5 Hz, 3J=5.8 Hz), 4.61 (dd, CHHO2C, 2J=11.5 Hz, 3J=8.1 Hz), 5.92 (dd, CHHb=trans to CO2, 2Jab=1.5 Hz, 3Jbc=10.6 Hz), 6.14 (dd, =CHc, 3Jac=17.2 Hz, 3Jbc=10.6 Hz), 6.43 (CHaH=cis to CO2, 2Jab=1.3 Hz, 3Jac=17.2 Hz). 13C NMR: 40.4 (CHBr), 53.5 (CH3), 64.3 (CH¬2O2C), 127.6 (CH=), 132.4 (CH2=), 165.4 (acrylate C=O), 168.3 (CO2CH3). Elemental analysis C7H9BrO4. Calculated C=35.47, H, 3.83 Found 35.29, H, 3.75.

In a separate experiment using a much more concentrated solution (1.3 M methyl 2-bromo-3-hydroxypropionate in THF), two liquid layers resulted when the reaction mixture was poured into ice-cooled water. The two layers were separated, and the organic phase was passed through basic activated alumina. The aqueous layer was extracted with CH2Cl2 (50 mL ea), and washed twice with dil. aq. NaHCO3 (50 mL ea) and once with satd aq NaCl (50 mL), and dried over Na2SO4. After filtration, and removing the solvent by rotary evaporation, the residue was combined with the residue from the alumina column, to yield 2.8 g residue of (2-bromo-2-methoxycarbonyl)ethyl acrylate. This material was separated by column chromatography using silica gel as the stationary phase and the following eluants: alkene alcohol eluted in fraction 12 using 90:10 hexanes/ethyl acetate as the eluant; 2.1 g of (2-bromo-2-methoxycarbonyl)ethyl acrylate eluted in fractions 13-15 using 95:5 hexanes/ethyl acetate as the eluant; and methanol eluted in fractions 16-22 using ethyl acetate as the eluant.

Synthesis of (2-Bromo-2-n-butoxycarbonyl)ethyl Acrylate inimer

A solution of acrylic anhydride (3.0 g, 15 mmol) in THF (1 mL) was added dropwise to a solution of n-butyl 2-bromo-3-hydroxypropionate (2.8 g, 8.9 mmol) and triethylamine (0.87 g, 8.6 mmol) in THF (2 mL), and the reaction mixture was stirred for 10 min at 0° C. After stirring at room temperature for an additional 16 h, the light yellowish solution was poured into ice water (200 mL). 1H NMR: 0.95 (t, CH3, J=8.7 Hz), 1.37 (hext, CH2CH3), 1.64 (quint, CH2CH2O2C), 3.93 (dd, CHHOH, 2J=12.0 Hz, 3J=5.5 Hz), 4.04 (dd, CHHOH, 2J=12.1 Hz, 3J=7.4 Hz), 4.23 (t, CH2O2C, J=6.6 Hz), 4.35 (dd, CHBr, 3J=5.6 Hz, 3J=7.4 Hz), 4.43 (dd, CHBr, 3J=8.1 Hz, 3J=8.7 Hz), 4.57 (dd, CHHO2C, 2J=8.6 Hz, 3J=5.3 Hz), 4.61 (dd, CHHO2C, 2J=10.5 Hz, 3J=1.8 Hz), 5.89 (dd, CHHb=trans to CO2, 2Jab=1.8 Hz, 3Jbc=10.5 Hz), 6.11 (dd, =CHc, 3Jac=10.5 Hz, 3Jbc=1.8 Hz), 6.44 (CHaH=cis to CO2, 2Jab=1.4 Hz, 3Jac=17.3 Hz). 13C NMR: 14.3 (CH3), 22.9 (CH2CH3), 28.6 (CH2CH2O2C), 44.2 (CHBr), 66.8 (CH2O2C), 127.6 (CH=), 132.2 (CH2=), 165.4 (acrylate C=O), 167.4 (CO2CH2). Elemental analysis CxHyBrO4.

Polymerization of the Inimers by Non-Emulsion Techniques for Comparison to Aqueous MiniEmulsion Systems 1. Atom Transfer Radical Copolymerization of (2-Bromo-2-methoxycarbonyl)ethyl Acrylate and Hydroxyethyl Methacrylate A solution of hydroxyethyl methacrylate (0.51 g, 2.38 mol) and (2-bromo-2-methoxycarbonyl)ethyl acrylate (0.03 g, 2.3 µmol) in toluene (x mL) was added via a syringe to a mixture of CuCl (2.8 mg, 28 µmol), CuCl2 (1.5 mg, 1.2 µmol) and dHBiby (24 mg, 68.1 µmol) in toluene (2.63 mL) in a N2-filled Schlenk tube sealed with a rubber septum. The polymerization mixture was degassed by three freeze-pump-thaw (10-30-20 min) cycles until no decavitation bubbles were observed, and the polymerization tube was back-filled with N2. The polymerization mixture was stirred at 120° C. for 72 h, during which time the solution became light blue in color and then the polymerization was quenched by immersing the Schlenk tube into liquid N2. The contents of the polymerization tube were thawed, exposed to the atmosphere, diluted with THF (5 mL), and passed through a plug of neutral alumina. After removing the THF by rotary evaporation, the remaining light yellowish oil product was dried in vacuo and then as a film was formed at atmospheric pressure and temperature to yield copolymer as a solid thin film; Mn=1.07×104, pdi=1.77; Tg=18° C.

2. Atom Transfer Radical Polymerization of (2-Bromo-2-methoxycarbonyl)ethyl Acrylate (25A)

The (2-Bromo-2-methoxycarbonyl)ethyl acrylate (0.3 g, 1.2 mmol) and then anisole (0.5 mL) were added to a mixture of CuBr (8.8 mg, 9.1 mol) and PMDETA (0.2 mg, 1.5 mol) in a N2-filled Schlenk tube sealed with a rubber septum. The polymerization mixture was degassed by three freeze-pump-thaw (10-30-20 min) cycles, and then the polymerization tube was back-filled with N2. After stirring at 120° C. for 64 h, the polymerization was quenched by immersing the Schlenk tube into liquid N2. The contents of the polymerization tube were thawed, exposed to the atmosphere, diluted with THF (2 mL), and passed through a plug of neutral alumina. THF was removed by rotary evaporation, and the remaining oil was dried in vacuo to yield hyperbranched poly(methyl acrylate) as a viscous slightly yellow oil; Mn=990 DA, MW=999, pdi=1.00; Tg=16° C.

(3) Atom Transfer Radical Polymerization of (2-Bromo-2-n-butoxycarbonyl)ethyl Acrylate (30A)

The (2-Bromo-2-n-butoxycarbonyl)ethyl acrylate (0.36 g, 1.3 mmol) and then anisole (10 mL) were added to a mixture of CuBr (8.0 mg, 55.8 mol) and PMDETA (9.7 mg, 56 mol) in a N2-filled Schlenk tube sealed with a rubber septum. The polymerization mixture was degassed by three freeze-pump-thaw (10-30-20 min) cycles, and then the polymerization tube was back-filled with N2. After stirring at 80° C. for 72 h, the polymerization was quenched by immersing the Schlenk tube into liquid N2. The contents of the polymerization tube were thawed, exposed to the atmosphere, diluted with THF (2 mL), and passed through a plug of neutral alumina. THF was removed by rotary evaporation, and the remaining oil was dried in vacuo to yield hyperbranched poly(n-butyl acrylate) as a viscous slightly yellow oil that was starting to solidify; Mn=8.63×104, pdi=2.28; Tg=18° C.

(4) Reverse Atom Transfer Radical Polymerization of (2-Bromo-2-methoxycarbonyl)ethyl Acrylate (24A)

The (2-Bromo-2-n-butoxycarbonyl)ethyl acrylate (0.36 g, 1.5 mmol) and then anisole (10 mL) were added under a stream of N2 to a mixture of AIBN (3.0 mg, 18 mol), CuBr2 (1.8 mg, 80 mol) and PMDETA (13 mg, 76 mol) in a N2-filled Schlenk tube sealed with a rubber septum. The polymerization mixture was degassed by three freeze-pump-thaw (10-30-20 min) cycles, and then the polymerization tube was back-filled with N2. After stirring at 80° C. for 24 h, the polymerization was quenched by immersing the Schlenk tube into liquid N2. The contents of the polymerization tube were thawed, exposed to the atmosphere, and precipitated by the addition of cold methanol (5 mL). The precipitate was collected in a fritted glass filter, washed with methanol until the filtrate was colorless, and then dried in vacuo to yield 0.25 g (69%) of hyperbranched poly(methyl acrylate) as a white solid; Mn=9.65×103, pdi=2.43.

5. Reverse Atom Transfer Radical Polymerization of (2-Bromo-2-n-butoxycarbonyl)ethyl Acrylate (2-Bromo-2-n-butoxycarbonyl)ethyl acrylate (0.33 g, 1.2 mmol) and then anisole (10 mL) were added under a stream of N2 to a mixture of CuBr2 (20 mg, 8.95 mol) and PMDETA (28 mg, 16.3 mol) in a N2-filled Schlenk tube sealed with a rubber septum. This inimer solution was degassed by three freeze-pump-thaw (10-30-20 min) cycles, and then transferred via a cannula to a second N2-filled Schlenk tube containing deoxygenated AIBN (3 mg, 18.26 mol) and anisole (10 mL). After stirring at 80° C. for 96 h, the polymerization was quenched by immersing the Schlenk tube into liquid N2. The contents of the polymerization tube were thawed, exposed to the atmosphere, and passed through a plug of neutral alumina. Residues of anisole was removed by rotary evaporation to yield hyperbranched poly(n-butyl acrylate) as a viscous slightly yellow oil; Mn=3.31×104, pdi=1.28.

Polymerization of the Inimers by Aqueous Miniemulsion Systems

6. Polymerization of (2-Bromo-2-methoxycarbonyl)ethyl Acrylate by Simultaneous Normal and Reverse Initiation (SINS) ATRP Emulsion Polymerization [17A]

The copper complex was prepared by dissolving CuBr2 (3.5 mg, 15.67 mmol), PMEDTA (26.0 mg, 150 µmol), hexadecane (7.2 mg, 31.8 mmol) and (2-bromo-2-methoxycarbonyl)ethyl acrylate (2.0 g, 8.4 mmol) at 60° C. in a N2-filled Schlenk tube. An additional initiator, methyl 2-bromopropionate (1.3 mg, 77 µmol), was then added via a syringe. This solution was slowly transferred via a cannula to a second N2-filled Schlenk tube containing a solution of Brij 98 (46 mg, 40.1 µmmol) diluted with enough deionized water (7.92 mL) to form a transparent solution. The resulting emulsion was degassed by purging it with N2 for 30 min, and the polymerization tube was then placed in an 80° C. oil bath, while stirring its contents. Since a stable emulsion did not result, additional hexadecane (2 mL, 79 µmol) and water (0.5 mL) were added and the rate of stirring was increased until a stable, light blue, emulsion resulted. After stirring at 80° C. for 72 h, the emulsion was white, and methanol (5 mL) was added to precipitate the polymer. A small amount of precipitate was collected in a fritted glass funnel, and the filtrate was passed through plug of neutral alumina. The solvents were removed by rotary evaporation to yield 0.44 g of hyperbranched poly(methyl acrylate) as a slightly yellow viscous oil; Mn=1.96×105, pdi=2.99; Tg=18° C.

7. Polymerization of (2-Bromo-2-n-butoxycarbonyl)ethyl Acrylate by Simultaneous Normal and Reverse Initiation (SINS) ATRP Miniemulsion Polymerization [31A]

The copper complex was prepared by dissolving CuBr2 (8.0 mg, 35.8 µmmol), PMEDTA (6.0 mg, 35 µmmol), hexadecane (7.2 mg, 32 µmmol) and (2-bromo-2-n-butoxycarbonyl)ethyl acrylate (0.46 g, 1.65 mmol) at 60° C. in a N2-filled Schlenk tube. An additional initiator, methyl 2-bromopropionate (13 mg, 77.8 µmmol), was then added via a syringe. This solution was slowly transferred via a cannula to a second N2-filled Schlenk tube containing a solution of Brij 98 (11 mg, 9.6 µmol) diluted with enough deionized water (4.5 mL) to form a transparent solution. A tendency of light blue emulsion was observed in the beginning of the reaction. After stirring at 80° C. for 72 h, the emulsion was white, and methanol (10 mL) was added to precipitate the polymer. A small amount of precipitate was collected in a fritted glass funnel, and the filtrate was passed through plug of neutral alumina. The residual solution was passed through neutral alumina and solvents were removed by rotary evaporation to yield hyperbranched poly(n-butyl acrylate) as a slightly yellow viscous oil; Mn=2.31×103, pdi=1.10; Tg=18° C.

8. Polymerization of (2-Bromo-2-methoxycarbonyl)ethyl Acrylate by AGET ATRP Miniemulsion Polymerization [26A]

The copper complex was prepared by dissolving CuBr2 (1.5 mg, 6.7 µmmol), PMEDTA (1.0 mg, 5.8 µmmol), hexadecane and (2-bromo-2-methoxycarbonyl)ethyl acrylate (0.5 g, 2.1 mmol) at 60° C. in a N2-filled Schlenk tube. An additional initiator, methyl 2-bromopropionate (3.0 mg, 17.9 µmmol), was then added via a syringe. This solution was slowly transferred via a cannula to a second N2-filled Schlenk tube containing a solution of Brij 98 (10 mg, 8.7 µmmol) diluted with enough deionized water (4.5 g) to form a transparent solution. The resulting emulsion was degassed by purging it with N2 for 30 min, and the polymerization tube was then placed in an 80° C. oil bath, while stirring its contents. A degassed (bubbled N2) solution of ascorbic acid (1.4 mg, 7.9 µmmol) in water (4.5 mL) was added to initiate the polymerization, and a stable, light blue, emulsion resulted. After stirring at 80° C. for 72 h, the emulsion was light yellow in color, and the contents of the polymerization tube were diluted with THF (5 mL), and passed through a plug of neutral alumina. The solvents were removed from the two-liquid-phase system by rotary evaporation, and the remaining oil was dried in vacuo to yield hyperbranched poly(methyl acrylate) as a viscous slightly yellow oil; Mn=3.02×104, pdi=1.27.

12. Polymerization of (2-Bromo-2-n-butoxycarbonyl)ethyl Acrylate by AGET ATRP Miniemulsion Polymerization in the Absence of Hexadecane The copper complex was prepared by dissolving CuBr2 (7.7 mg, 35 µmol), PMEDTA (10 mg, 57.7 µmol) and (2-bromo-2-n-butoxycarbonyl)ethyl acrylate (0.55 g, 2.0 mmol) at 60° C. in a N2-filled Schlenk tube. An additional initiator, methyl 2-bromopropionate (15 mg, 89.8 µmol), was then added via a syringe. This solution was slowly transferred via a cannula to a second N2-filled Schlenk tube containing a solution of Brij 98 (30 mg, 26.16 µmol) in deionized water (4.8 g), resulting in a light blue emulsion. The emulsion was sonicated for 1 h, and then degassed by purging it with N2 for 30 min. The polymerization tube was placed in an 85° C. oil bath, while stirring its contents. A degassed (bubbled N2) solution of ascorbic acid (5.x mg, 28.32 mol) in water (0.5 g) was added to initiate the polymerization, and the color of the emulsion changed from light blue to white. While stirring at 85° C., several aliquots were taken from the polymerization over the next 72 h to monitor the inimer conversion and the molecular weight and thermal properties of the resulting polymers; for example, at after 5 minutes Mn=8.92×103, pdi=1.87; at 24 h, Mn=4.36× 103, pdi=2.26; after 72 h, Mn=5.61×103, pdi=1.76. A small amount of precipitate at the bottom of the Schlenk tube had Mn=3.45×103, pdi=1.80. Tg=−48° C., −27° C., −2° C.

13. Polymerization of (2-Bromo-2-n-butoxycarbonyl)ethyl Acrylate by AGET ATRP Miniemulsion Polymerization A solution of CuBr2 (8.x mg, 35.8 mmol), Me6TREN (8.5 mg, 37 µmol), hexadecane (18 mg, 79.5 µmol) and (2-bromo-2-n-butoxycarbonyl)ethyl acrylate (0.5 g, 1.79 mmol) was first heated to 60° C. in a Schlenk tube sealed with a rubber septum, and then degassed by vacuum freeze-pump-thaw (10-30-20 min) cycles. The polymerization tube was back-filled with N2, and DMF (0.15 mL) was added to dissolve the resulting light green mixture. An additional initiator, methyl 2-bromopropionate (8.9 mg, 53.3 µmol), was then added via a syringe. This solution was slowly transferred via a cannula to a second N2-filled Schlenk tube containing a solution of Brij 98 (0.05 mg, 43.6 µmol) in deionized water (6.25 g). The resulting hazy solution was sonicated for 60 min, and then degassed by purging it with N2 for 30 min. The polymerization tube was placed in an 85° C. oil bath, while stirring its contents, and a degassed (bubbled N2) solution of ascorbic acid (5.x mg, 85.2 mmol) in water (0.5 g) was added to initiate the polymerization. After stirring at 85° C. for 72 h, the polymer had precipitated. The contents of the polymerization tube were diluted with dry THF (10 mL), and passed through a plug (1 g) of neutral alumina. The solvents were removed from the two-liquid-phase system by rotary evaporation, and the remaining oil was dried in vacuo to yield (18%) of hyperbranched poly(n-butyl acrylate) as a slightly yellow viscous oil; Mn=1.4×105, pdi=1.26; low molecular weight peak Mn=1.41×103, pdi=1.51.

14. Polymerization of (2-Bromo-2-n-butoxycarbonyl)ethyl Acrylate by AGET ATRP Miniemulsion Polymerization Using Commercial Non Ionic Surfactant Surfactants A and N [38B]

A solution of CuBr2 (1.9 mg, 85.1 µmol), PMDETA (73 mg, 421.2 µmol), hexadecane (72 mg, 317.9 µmol) and (2-bromo-2-methoxycarbonyl)ethyl acrylate (1.2 g, 1.9 mmol) was first heated to 60° C. in a Schlenk tube sealed with a rubber septum, and then degassed by vacuum freeze-pump-thaw (10-30-20 min) cycles. The polymerization tube was back-filled with N2, and an additional initiator, methyl 2-bromopropionate (15 g, 89.9 µmol), was added via a syringe. This solution was slowly transferred via a cannula to a second N2-filled Schlenk tube containing a solution of surfactant N (2.5 mg, 2.66 µmmol) in deionized water (6.2 g), resulting in a colorless emulsion. The polymerization solution was purged with N2 for 30 min, and the polymerization tube was placed in an 80° C. oil bath. While stirring its contents, a degassed (bubbled N2) solution of ascorbic acid (1.5 mg, 85.2 mol) in water (1.2 g) was added to initiate the polymerization, resulting in a light blue emulsion. Since both GPC and 1H NMR analyses demonstrated that monomer was still present after stirring at 80° C. for 72 h. While stirring at 80° C., several aliquots (2 µL) were taken from the polymerization over the next 72 h to monitor the inimer conversion and the molecular weight of the resulting polymers. Each aliquot was diluted with dry THF (10 mL), passed through a plug (1 g) of neutral alumina, and filtered. Yield=52%.

15. Copolymerization of 1:9 (2-Bromo-2-n-butoxycarbonyl)ethyl Acrylate and Butyl Acrylate by AGET ATRP Miniemulsion Polymerization [45A]

The copper complex was prepared by dissolving CuBr2 (19 mg, 85.1 mol), PMEDTA (15 mg, 86.6 µmol), hexacane (72 mg, 317.9 µmol), n-butyl acrylate (2.0 g, 15.5 mmol) and (2-bromo-2-n-butoxycarbonyl)ethyl acrylate (0.53 g, 1.5 mmol) at 60° C. in a N2-filled Schlenk tube. An additional initiator, methyl 2-bromopropionate (13 mg, 532.9 µmol), was then added via a syringe. This solution was slowly transferred via a cannula to a second N2-filled Schlenk tube containing a solution of Brij 98 (50 mg, 43.6 µmol) in deionized water (7.9 g), resulting in a light blue emulsion. The emulsion was sonicated for 1 h, and then degassed by purging it with N2 for 30 min. The polymerization tube was placed in an 85° C. oil bath, while stirring its contents. A degassed (bubbled N2) solution of ascorbic acid (20 mg, 113.6 mol) in water (0.5 g) was added to initiate the polymerization, and the color of the emulsion changed from light blue to white. While stirring at 85° C., several aliquots were taken from the polymerization over the next 72 h to monitor the inimer conversion and the molecular weight and thermal properties of the resulting copolymers. A small amount of precipitate remained at the bottom of the Schlenk tube.

16. Copolymerization of 1:1 (2-Bromo-2-n-butoxycarbonyl)ethyl Acrylate and n-Butyl Acrylate by AGET ATRP (1:1 molar ratio) [49A]

Miniemulsion Polymerization. The copper complex was prepared by dissolving CuBr2 (2.3 mg, 10.3 µmol), PMEDTA (2.0 mg, 11.5 µmol), hexadecane (70 mg, 309.1 µmol), n-butyl acrylate (2.0 g, 2.6 mmol) and (2-bromo-2-n-butoxycarbonyl)ethyl acrylate (0.60 g, 2.1 mmol) at 60° C. in a N2-filled Schlenk tube. An additional initiator, methyl 2-bromopropionate (90 mg, 532.9 µmol), was then added via a syringe. This solution was slowly transferred via a cannula to a second N2-filled Schlenk tube containing a solution of Brij 98 (50 mg, 43.6 µmol) in deionized water (7.9 g), resulting in a light blue emulsion. The emulsion was sonicated for 1 h, and then degassed by purging it with N2 for 30 min. The polymerization tube was placed in an 85° C. oil bath, while stirring its contents. A degassed (bubbled N2) solution of ascorbic acid (15 mg, 85.2 µmol) in water (7.9 g) was added to initiate the polymerization, and the color of the emulsion changed from light blue to white. While stirring at 85° C., several aliquots (2 mL) were taken from the polymerization over the next 72 h to monitor the inimer conversion and the molecular weight and thermal properties of the resulting copolymers. Each aliquot was diluted with dry THF (10 mL), passed through a plug (1 g) of neutral alumina. GPC data Mn=2.31*104; Mw=7.39*104 and pdi=3.19.

17. Copolymerization of (2-Bromo-2-n-butoxycarbonyl)ethyl Acrylate and Styrene (1:9) by AGET ATRP Miniemulsion Polymerization (45B)

The copper complex was prepared by dissolving CuBr2 (19 mg, 85 mol), PMEDTA (15 mg, 86.6 µmol), hexadecane (72 mg, 317.8 µmol), styrene (2.0 g, 19.14 µmol) and (2-bromo-2-n-butoxycarbonyl)ethyl acrylate (0.53 g, 1.9 mmol) at 60° C. in a N2-filled Schlenk tube. An additional initiator, methyl 2-bromopropionate (13 mg, 77.8 µmol), was then added via a syringe. This solution was slowly transferred via a cannula to a second N2-filled Schlenk tube containing a solution of Brij 98 (50 mg, 43.6 µmol) in deionized water (7.9 g), resulting in a light blue emulsion. The emulsion was sonicated for 1 h, and then degassed by purging it with N2 for 30 min. The polymerization tube was placed in an 85° C. oil bath, while stirring its contents. A degassed (bubbled N2) solution of ascorbic acid (15 mg, 85.2 µmol) in water (0.5 g) was added to initiate the polymerization, and the color of the emulsion changed from light blue to white. While stirring at 85° C., several aliquots were taken from the polymerization over the next 72 h to monitor the inimer conversion and the molecular weight of the resulting copolymers. A small amount of precipitate remained at the bottom of the Schlenk tube. GPC data Mn=1.12*104 and Mw (Da) 3.36*104 and pdi=3.1

18. Polymerization of (2-Bromo-2-n-butoxycarbonyl)ethyl Acrylate by AGET ATRP Miniemulsion Polymerization in the Absence of Methyl 2-bromopropionate The copper complex was prepared by dissolving CuBr2 (9.7 mg, yy mmol), PMEDTA (2.4 mg), hexadecane (1.8 mg) and (2-bromo-2-n-butoxycarbonyl)ethyl acrylate (0.52 g) at 60° C. in a N2-filled Schlenk tube. This solution was slowly transferred via a cannula to a second N2-filled Schlenk tube containing a solution of Brij 98 (10 mg) in deionized water (4.5 g), resulting in a light blue emulsion. The emulsion was sonicated for 30 min, and then degassed by purging it with N2 for 30 min. The polymerization tube was placed in an 80° C. oil bath, while stirring its contents. A degassed (bubbled N2) solution of ascorbic acid (3.6 mg) in water (0.5 g) was added to initiate the polymerization, and the color of the emulsion changed from light blue to white. While stirring at 80° C., several aliquots were taken from the polymerization over the next 72 h to monitor the inimer conversion and the molecular weight of the resulting polymers. A hazy emulsion was the final sample which was stored after 72 hrs. Methanol was added for precipitation. Some of them were soluble in THF which passes through neutral alumina and solvent was eliminated by rotavapor (Yield=52%). Results after 1 hrs Mn=1.82*105, pdi=1.15; after 24 hrs (soluble in THF) Mn=1.66*105, pdi=1.20; low molecular weight Mn=927; and pdi=1.00. Precipitation with methanol Mn=2.50*105. pdi=1.52.).

What is claimed is:

1. A method for the production of hyperbranched polyacrylates comprising the step of:
reacting acrylic inimers through controlled living polymerization in aqueous conditions to produce a hyperbranched polyacrylate with a number average molecular weight determined by gel permeation chromatography relative to calibration curves prepared using linear polystyrene from 50,000 Da to 1,000,000 Da; wherein the hyperbranched polyacrylate has a polydispersity index from 1.0 to 5; wherein the controlled living polymerization is carried out in emulsion or in miniemulsion.

2. The method of claim 1, wherein the controlled living polymerization is selected from atom transfer radical polymerization (ATRP), reverse ATPRP, simultaneous normal and radical initiated (SN&RI) polymerization, activators generated by electron transfer (AGET) ATRP, reversible addition-fragmentation chain-transfer (RAFT) polymerization, and nitroxide mediated polymerization.

3. The method of claim 2, wherein the polymerization is carried out in a miniemulsion.

4. The method of claim 1, wherein the acrylic inimer is:

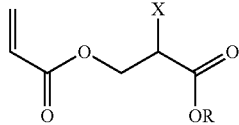

wherein X is a halogen and R is selected from hydrogen, methyl, dodecyl, and groups containing mesogenin substituents, fluorocarbon substituents, siloxane substituents and oxyethylene substituents.

5. The method of claim 4, wherein the controlled living polymerization is selected from reverse ATRP, SN&RI and AGET polymerization.

6. The method of claim 1, wherein the acrylic inimer is:

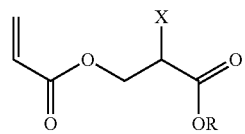

wherein X is a thiocarbonylthio group and R is selected from hydrogen, methyl, dodecyl, and groups containing mesogenin substituents, fluorocarbon substituents, siloxane substituents and oxyethylene substituents.

7. The method of claim 6, wherein the controlled living polymerization is RAFT polymerization.

8. The method of claim 1, wherein the acrylic inimer is:

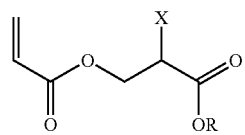

wherein X is a nitroxide group and R is selected from hydrogen, methyl, dodecyl, and groups containing mesogenin substituents, fluorocarbon substituents, siloxane substituents and oxyethylene substituents.

9. The method of claim 8, wherein the controlled living polymerization is nitroxide mediated polymerization.

10. The method of claim 1, where the hyperbranched polyacrylate has a number average molecular weight from 50,000 Da to 500,000 Da.

* * * * *